(12) United States Patent
Edlund et al.

(10) Patent No.: US 6,416,567 B1
(45) Date of Patent: Jul. 9, 2002

(54) REMOVAL OF MERCURY FROM WASTE MATERIALS

(75) Inventors: Mark G. Edlund, Lake Elmo, MN (US); James R. Cornwell, Muskego; Steven A. Rush, Burlington, both of WI (US)

(73) Assignee: Mercury Waste Solutions, Inc., Mankato, MN (US)

( * ) Notice: Subject to any disclaimer, the term of this patent is extended or adjusted under 35 U.S.C. 154(b) by 0 days.

(21) Appl. No.: 08/820,490

(22) Filed: Mar. 18, 1997

(51) Int. Cl.[7] ............................................. C22B 43/00
(52) U.S. Cl. ..................................... 75/670; 260/148
(58) Field of Search ........................... 75/670; 266/148, 266/149, 165; 405/128; 588/234, 235

(56) References Cited

U.S. PATENT DOCUMENTS 4,606,762 A * 8/1986 Sikander et al. ............... 75/81
5,120,409 A * 6/1992 Hanulik ........................ 204/105
5,300,137 A * 4/1994 Weyand et al. ............... 75/670

* cited by examiner

*Primary Examiner*—M. Alexandra Elve
(74) *Attorney, Agent, or Firm*—Schwegman, Lundberg, Woessner & Kluth PA

(57) ABSTRACT

Mercury is efficiently and effectively removed from waste materials by a process and apparatus which heats waste containing mercury to temperatures well above the boiling point of mercury to create a vapor stream laden with mercury vapor. This vapor stream is first cooled to a temperature at least 100° F. above the boiling point of mercury, which allows some condensation of impure mercury with other materials, and creates a second vapor stream comprising mercury. This second vapor stream is then cooled to a temperature below the boiling point of mercury to condense more pure condensates of mercury. A third cooling step optionally may then be used to cool the remaining vapor stream to temperatures below the boiling point of mercury to remove further mercury content from the vapor stream. Filters and/or scrubbers may be added to remove trace amounts of mercury from the effluent vapor stream.

30 Claims, 2 Drawing Sheets

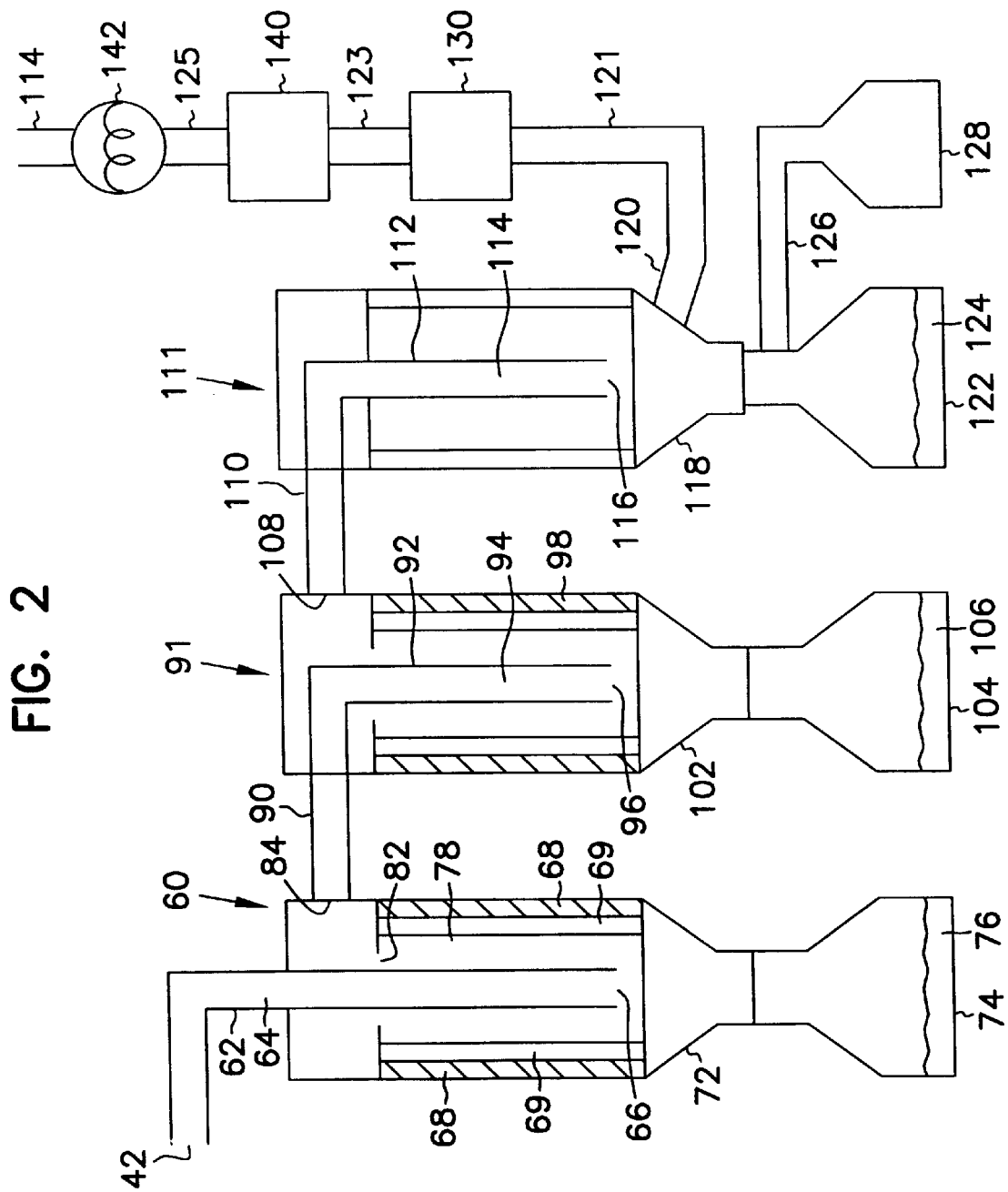

REMOVAL OF MERCURY FROM WASTE MATERIALS

BACKGROUND OF THE INVENTION

1. Field of the Invention

The present invention relates to processes and apparatus for the removal of mercury contaminants from waste materials. In particular, the present invention describes a thermal recovery process (which allows ambient air to be present within the system) and apparatus for the efficient removal of mercury and the recovery of mercury from waste materials, especially waste materials such as batteries, crushed lamps, switches and the like.

2. Background of the Art

One of the many serious forms of pollution which has been created by industry has been the levels of mercury introduced into the environment from manufactured goods. Amongst the more prominent incidents involving mercury were the Minnimata contamination in Japan and the swordfish warnings in the 1950's. At Minnimata, mercury waste from a local manufacturing company contaminated a bay and many local residents ingested high levels of mercury from fish. The effects of mercury, like those of many heavy metals, are quite devastating, prolonged, and difficult to treat. Mercury is particularly dangerous because, even though it is a liquid and its boiling point is about 675° F. (356.6° C.), it is hygroscopic or hydroscopic and enters the surrounding air and water system quickly. It is also injurious in small doses which can be rapidly ingested from breathing contaminated air and is highly persistent after it has been ingested.

Even with its serious potential for harm, mercury has many significant commercial uses and is widely accepted in the electrical and electronics area as a conductor. Mercury is conventionally used, for example, as a component in batteries, as a contact for electrical switches, as circuit connectors and switches in thermostats, and as conductors in fluorescent lamps. Because of the large volume of use for mercury, there is also a large volume of mercury waste which is created each year. Mercury may not be deposited in solid waste landfills because of its known hazardous effects on the environment, and burying it is merely a temporary and unsafe disposal method since mercury will readily enter the water table and spread in the environment. It can be further distributed within the ecosystem if ingested by bacteria, insects or the like.

One method of recovering mercury commercially is to take the waste products containing mercury, place them within a drum or container (e.g., a fifty-five gallon drum), place the container within an autoclave, and heat the container well above the boiling point of mercury to evaporate the mercury into a collection point (e.g., condensation chamber).

Earlier, non-public attempts by the present inventors at such mercury collection systems used long, repeating cooling pipes (much like steam radiators) to air cool the mercury in the heated waste stream from the autoclave. Solidified (liquefied) mercury would be drained from the pipe (with other condensed materials) and the residue of the waste stream would then be cooled to further condense materials (including additional mercury) in the waste stream. This process would have been highly inefficient, and would have been quite costly to run. The long length of cooling pipes needed for the process would clog from deposited mercury (usually in the form of amalgams or cocondensed waste) within the pipes, the lining of the pipes could easily react with the mercury, causing removal and/or deposition of metal or amalgam, extreme amounts of heat would be produced locally around the pipes which would require cooling measures for the work environment, and other adverse features of this attempted arrangement dictated against this type of process. The volume capability of systems which work only with batch processing of waste containing mercury also greatly limit the ability of such systems to address the volume requirements of mercury waste treatment needs.

To respond to the need for more efficient and improved quality recovery and removal of mercury from water streams, improved processes and equipment are needed.

SUMMARY OF THE INVENTION

The present invention relates to a process and apparatus for the removal of mercury from waste materials and for the recovery of mercury in an environmentally safe and economic manner. The method is performed by apparatus which heats the mercury waste (in a batch or continuous fashion) and which recovers mercury from the effluent vapor stream from the heating step by repeated, controlled cooling of the vapor stream to selectively condense materials from the vapor stream. The heated vapor stream is first cooled from the high temperatures directly emitted from a heating zone (at temperatures above 1000° F. [538° C.]) down to a temperature above the boiling point of mercury (~675° F. [~357° C.]) to remove additional pollutants from the stream other than the major portion of the mercury. This is followed by subsequent cooling of the vapor stream to a temperature below the boiling point of mercury, and then preferably transferred to a third cooling zone which further condenses the majority of condensable residues in the heated vapor stream. The gaseous stream may then be further filtered to reduce the amount of other hazardous pollutants in the vapor (gas) stream. This is preferably done by a system of scrubbers and filters. By this process and the described apparatus, very high percentages of the mercury in the waste can be recovered with little or no introduction of mercury into the waste stream or the environment.

BRIEF DESCRIPTION OF THE DRAWINGS

FIG. 2 shows a diagrammatic view of the cooling 70 and filtering 80 portions of the apparatus of the invention.

DETAILED DESCRIPTION OF THE INVENTION

Figure 1:
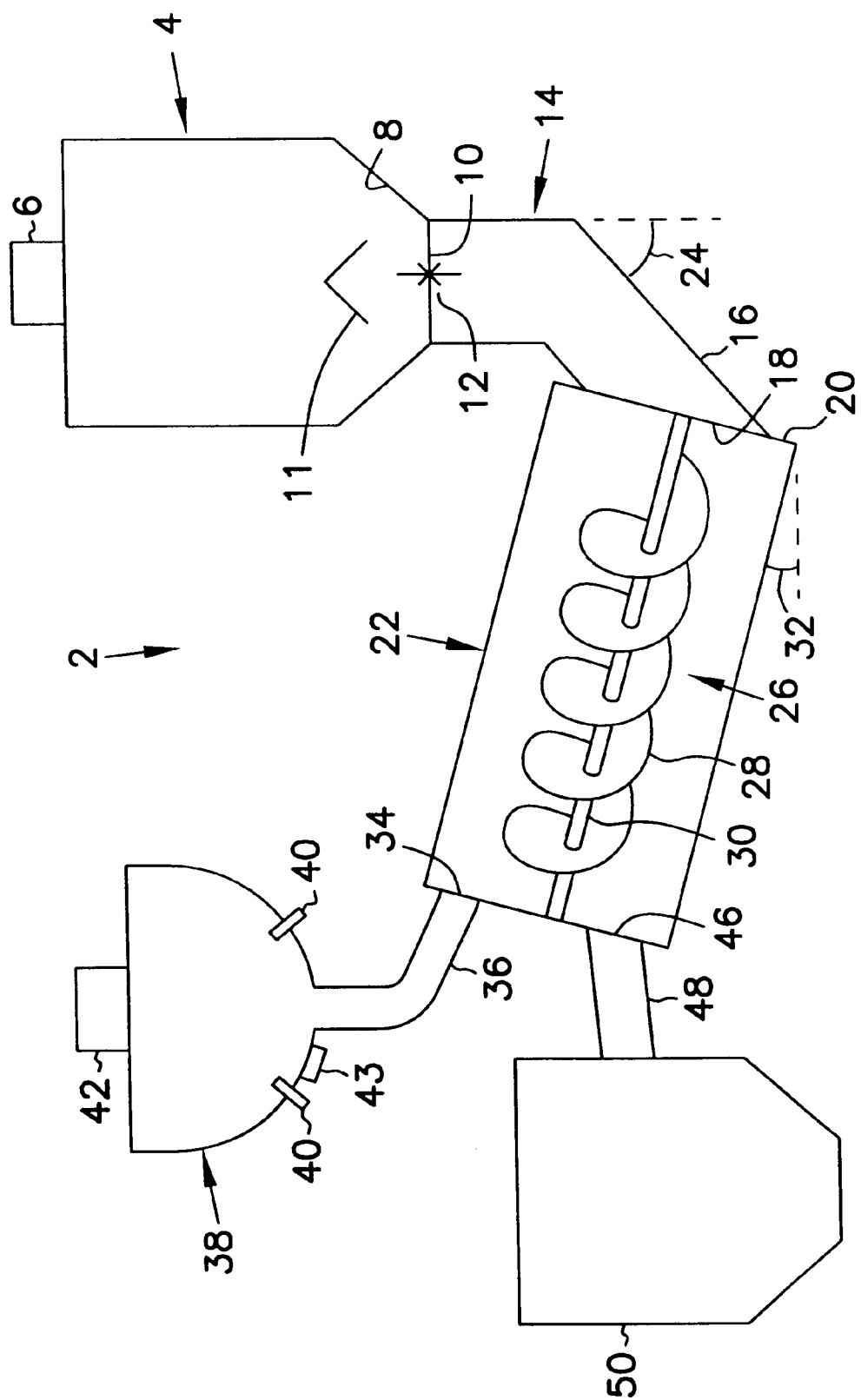
FIG. 1 shows a diagrammatic representation of the waste vapor stream generating apparatus 2 used in the practice of the present invention.

The toxicity and persistence of mercury wastes are well documented and proven in scientific literature. The difficulty in its recovery is in large part due to the precise properties which make mercury such a serious environmental threat. Although it has a lower vapor pressure than most heavy metals, it combines readily with other materials to be carried away in various forms (as a gas, liquid or solid), is more readily absorbed and carried by the atmosphere and water, and it can become active towards organic systems either in its original elemental form or in a readily converted form. The difficulty in designing a system for mercury recovery which will not create significant environmental problems, yet will work efficiently and economically, has been a serious challenge. The present apparatus and process improves upon the existing technology used for recovery of mercury and its elimination from waste streams.

FIG. 1 shows a diagrammatic representation of the waste vapor stream generating apparatus 2 used in the practice of the present invention. Waste material containing mercury (not shown) is deposited into an initial collection hopper 4, preferably through a vacuum line 6 through which pressure is maintained to force waste material through the vacuum line 6 into the collection hopper 4. The vacuum should be sufficiently strong (e.g., a draw which is greater than 1 lb/in$^2$, preferably at least 5 lb/in$^2$, more preferably at least 7 or 9 lb/in$^2$, and most probably no more than 10 lb/in$^2$) to assure that mercury vapor, which surrounds the mercury containing waste, does not escape from the vacuum line 6 and the ambient area around the hopper 4. The waste containing material should be of dimensions that can readily enter the vacuum line 6 without readily blocking or damaging it. The opening to the vacuum line 6 may be of any useful dimension, but it has been found that diameters of from about 2 to 12 inches (5 to 31 cm) are particularly desirable, with dimensions of 3 to 8 inches (7.6 to 21 cm) preferred and 5 to 7 inches (13 to 17.7 cm) most preferred.

The inner surface 8 of the hopper 4 is preferably coated (e.g., teflon, polysiloxanes, abrasion resistant polymers, etc.) to reduce the effects of the significant abrasion which can occur from passage of waste material through the hopper 6 to the exit 10 at the bottom. As the waste material will often include metal scrap, glass, inorganic oxide powder and the like, there is significant abrasive action against the interior surface 8. A flow control means or mechanism 12 should be present at the exit 10 from the hopper 4 to promote and control the flow of waste material. Such mechanisms include rotary airlocks, pinch valves, and slide gate valves to keep negative pressure on the system. Rotary airlocks are preferred because of their durability and efficiency. A cap 11 may be placed over the rotary airlock 12 to reduce damage to or jamming of the rotary airlock 12. The diameter of the exit 10 should also be sufficiently large to allow waste to pass through the system. Dimensions of at least about 4 to 16 inches (10 to 42 cm) are preferred. A carrying tube 14 extends downward from the exit 10 towards the oven 22. The tube 14 will usually have an angled portion 16 which enters the oven 22 through a port 18 in a side 20 of the oven 22. The angle 24 of the angled portion 18 of the carrying tube 14 should not exceed 50° and preferably should be less than or equal to 45° from vertical. It is more preferable that it be less than 40° to prevent backup or stoppage of waste material within the carrying tube 14.

After the angled portion of the tube 16 enters the oven 22 through the port 18 in the side 18 of the oven 20, waste material (not shown) is deposited onto a carrying means 26 within the oven 22. The carrying means 26 shown is like the drive in a screw auger, with continuous blades 28 on a shaft 30. The preferred carrying means is a rotary kiln in which the flights are secured to the interior walls of the kiln to form a rotating path. Waste material (not shown in this figure) is deposited from the port 18 onto the carrying means 26 and carried through the oven 22. The temperature within the oven 22 is maintained at a high enough level to assure evaporation of the mercury from the waste material. That temperature must be above 900° F., preferably above 1000° F., more preferably above 1100° F., and most preferably at 1200° F. or above. The oven 22 is shown tilted at an angle 32 to provide another specific benefit to the configuration, especially where the screw drive 26 is shown as the carrying means 26. With an angle 32 between 2.5° and 15°, waste material which is moved by the blades 28 of the screw carrying means 26 is also tumbled within the oven 22 to increase the amount of time in which surface area of the waste material is exposed. This tumbling increases the efficiency of the evaporation from the surface of the waste. This is a significant advantage, and is effectively accomplished only with appropriate angling of the oven 22 with respect to the angle (not specifically shown) formed between the blades 28 and the shaft 30 of the screw carrying means 26. If the pitch of the blades changes, the angle 32 of the oven may also change within acceptable limits, even beyond the 2.5° and 15° previously mentioned. The heating zone (e.g., an oven or kiln) may be alternatively viewed as a means for moving said material within said heating zone, the material being moved by means of blades on a shaft and said shaft within said heating zone, with the movement within said heating being at an angle between 2.5° and 15 to the ground (outside of the heating zone, since the angle of the movement is relative to the effects of gravity pulling material downward). That angle 32, or the other angle for blades 28 of a different pitch is based upon the minimum angle assuring tumbling and exposure of the waste material and the maximum angle preventing the waste from tumbling back over a trailing edge of the blades 28 on the carrying means 26. Vibrating carriers, drag chain carriers and the like could also be used, but they have structural and functional limitations such that the screw drive 26 is highly preferred. It is particularly desirable, as shown later, to have waste material enter the side 20 of the oven 22 through the port 22 and be deposited on a blade of the carrying means 26 beyond the first turn of the blade away from the port 18. This prevents waste material from being dumped onto a floor surface of the oven 22.

The passage of waste material through the heating area of the oven 22 removes the vast majority of entrapped mercury in the waste and carries it as a vapor stream (not shown) through an exit port 34 to vapor carrying pipes (or tubing) 36 to a velocity drop box 38 to help remove solid materials (not shown) such as dust and other particulates from the heated vapor stream (not shown). The velocity drop box 38 preferably contains at least one and more preferably two heating means 40 to maintain the temperature of the vapor stream within the velocity drop box 38 and through the velocity drop box 38 exit port 42. Without these heating elements 40, it was found that the mercury would have a greater tendency to condense or amalgamate within the drop box 38, even though the temperature was still well above the boiling point of mercury. This was because of the strong affinity of the mercury for other materials within the system (within the vapor stream). The temperature of the vapor stream to the velocity drop box 38, in the velocity drop box, and exiting the velocity drop box should remain at least within 100° C. of the temperature within the exit stream of vapor from the oven 22 in the carrying tube 36 (preferably greater than 900° F., more preferably greater than 1000° F., still more preferably greater than 1100° F., and most preferably 1200° F. or more. It is preferable that the temperature at any point along this path (from oven exit port 34 to carrying tube 36 to velocity drop box 38 through the exit 42) should remain within 50° C. of the oven temperature, more preferably within 25° C. of the oven temperature, and even equal to the oven temperature. That oven temperature must be above 900° F, preferably above 1000° F., more preferably above 1100° F., and most preferably at 1200° F. or above.

Solid material (not shown) collected in the velocity waste box 38 may be removed through waste outlet 43 in the velocity drop box 38. This would be done on a batch basis. If any significant mercury content is found in this waste, it can be recycled through the oven by redepositing it into the hopper 6.

Solid waste material (not shown) which passes through the oven 22 may exit through a solid exit port 46 and pass into a solid waste tubing 48 and taken to a solid waste hopper 50.

FIG. 4 shows the cooling section 70 of the present apparatus. The hot vapor from the oven 22 after the velocity drop box 38 passes from ventin tubing 42 to the first cooling unit 60. This cooling unit 60 comprises an inlet tube 62 which carries the heated vapor (not shown) in the passageway 64 within the tubing 62. The temperature of the vapor before it enters the tubing 62 is at or about the exit temperatures mentioned as desirable for the vapor vented from the velocity drop box 38. That temperature must be above 900° F., preferably above 1000° F., more preferably above 1100° F., and most preferably at 1200° F. or above. The volume of vapor entering the first cooling unit 60 is preferably above 50 cubic feet per minute (cfm), more preferably above 100 cfm, still more preferably above 125 cfm, and in the actual operation of the equipment is about 150 cfm. at the elevated temperatures within the tubing 62. The flow is preferably at a maximum of 200 cfm, more preferably below 175 cfm. The heated vapor passes down the tubing 62 to the opening 66 at the bottom of the tubing 62. The first cooling unit should have an insulation 68 around the exterior or interior walls to maintain confinement of the heat captured from the vapor stream. There must be a cooling capability within the tank as with a cooling means 69 which may be a water flow cooled surface (e.g., with an aqueous system of water plus polyethylene glycol at 20 degrees F.). Other cooling systems, e.g., air flow cooled, Peltier units, etc.) may be used, but non-contact water cooling systems are preferred. When the heated vapor stream (not shown) is cooled in the cooling unit 60, material condenses, drops within the collection area 72 and is collected within a chamber 74 where the first traces of mercury and other condensates appear as product 76. This first cooling unit preferably cools the vapor stream to a temperature which is above the boiling point of mercury (~675° F. [~357° C.]). The temperature is preferably above 700° F. to assure that most of the mercury remains in the vapor phase. Even though the first cooling unit 60 does not cool the gaseous stream to a temperature below that boiling point temperature, some mercury is pulled out of the vapor phase by its attraction to other condensates, such as decomposed polymer, waxes, resins, and other materials from within the waste stream which were evaporated during the oven heating step. The condensate at this point is not commercially useful, but should actually be added back to the initial waste stream before treatment by the oven by reintroduction to the hopper 6.

The vapor stream, now at a first reduced temperature, has passed from the exit 66 of the tubing 62, passed into the major cooling area 69, passed through openings 82 at the top of the interior of the cooling unit 62, and exited through a port 84 into a tubing 90 which leads to a second cooling unit 91. This unit may be substantially identical in construction to the first unit, with vertical tubing 92, pipe interior 94, exit 96, collection area 102, chamber 104, product 106 (which is now relatively pure mercury, e.g., >90% by weight mercury, even as much as >95% by weight mercury), insulation 98, cooling surface 99, exit port 108, and exit tubing 110. This exit tubing is preferably, but not essentially connected to a third cooling unit 111. The third cooling unit 111 is needed depending upon the final second reduced temperature achieved in the second cooling unit 91. The temperature of the vapor stream leaving the second cooling unit 61 should be substantially below the boiling point of mercury. It is preferred that this temperature be below 450° F., more preferably below 375° F., and most preferably below 325° F. or equal to or less than 300° F. If there is the preferred third cooling unit 111, the construction of the preferred third cooling unit 111 preferably is again similar to the construction of the first cooling unit 60, except for the following features. The flow is preferably downward only, and through a multiple number of tubes. Additionally the exit ports are at the bottom, because different materials are vented and collected in the third unit 60. After passing through a vertical pipe 112, the vapor stream, now at a lower but still elevated temperature, passes through the vertical opening 114, and through the exit 116. A collection chamber 122 is at the bottom of the unit, but an overflow tube 126 is present to carry away lower density materials. Some mercury 124 is still collected in the chamber 122. Lighter weight materials carried away by an overflow tube 126 would include water (not shown) which is collected in a chamber 128. A vapor vent 126 is also present at the bottom of the chamber to carry the vapor flow out of the cooling unit 111. The vapor flow is directed through tubing 121 to a first filter unit 130, then through additional tubing 123 to a second vapor filter unit 140, and by further tubing 125 to an air scrubber 142. Vapor vented through a vent 144 would contain substantially no mercury and would be environmentally safe.

The process of the present invention may be described as follows, with or without reference to the flow diagram of FIG. 2. Step 1—Mercury containing waste is heated to a temperature at least 300° F. (166.7° C.) above the boiling temperature of mercury. Preferably the waste is heated to a temperature at least 400° F. (222.2° C.), and more preferably at least 500° F. (277.8° C.) above the boiling point of mercury. The system of the invention in experimental operation provides an internal oven temperature of about 1200° F. A vapor stream is removed from the oven and transported at elevated temperatures (approximately equal to or at least within 100–200° F. of the oven temperature) to a first cooling unit (with or without intermediate steps, such as the velocity drop box and heating elements) where the temperature of the vapor stream is reduced by at least 200° F. to a temperature which is still above the boiling point of mercury. Preferably the temperature drop in the first cooling unit is at least 300° F., more preferably at least 350° F. to 450° F. The actual temperature drop in the performing apparatus is 500° F., to a temperature of 700° F. from an entering temperature of 1200° F. Condensate is removed from the vapor stream, and the stream is then sent at the first elevated exit temperature of the first cooling unit to a second cooling unit. The second cooling step reduces the temperature of the vapor stream to a second reduce vapor exit temperature by at least 200° F., preferably at least 250 to 300° F., and in actual operation was optimized at about a 400° F. temperature drop to about 300° F. Mercury condensate at a fairly pure level (e.g., >90% by weight) is collected and the vapor stream, at the second reduced, but still elevated exit temperature to a preferred third cooling unit. The third cooling unit reduces the temperature of the vapor stream to less than the boiling point of water, preferably less than 100° F., more preferably less than 75° F., and most preferably below 50° F. The actual preferred temperature during operation is about 40° F. to reduce the vapor pressure of mercury to $2.228 \times 10^{-4}$ mm/Hg or less. Further condensate, including some hazardous materials is collected, and the vapor stream is then treated for removal of undesirable wastes. This further removal is by filtration, as by activated (especially Sulfur activated) carbon filters, with preferably two series filtrations performed, which is in turned followed by air scrubbers (e.g., water air scrubbers). These last filters are safety backups to insure that less pollutant may escape the system.

The volume flow of vapor leaving the heating zone and/or entering the first cooling element has been estimated above as about 150 cfm (cubic feet per minute). This amount is based upon the actual size of the equipment used and the gas pressure maintained across the system. With larger equipment, the volumes could always be greater, and conversely smaller with smaller equipment. This volume of gas flow through the system is not uniform in volume. As the air is cooled, the volume of the gas stream (and the rate of flow) diminishes, primarily because of the reduction in temperature and not because of mass removal from the gas stream. In the first cooling system, for example, the gas flow may be reduced by at least 10% by volume (more preferably at least 15% by volume) primarily because of the temperature drop (e.g., 1200° F. to 700° F., which is a drop of about 500° F./1750 absolute degrees, or 28%). In the second cooling element, the temperature drop may be about 400° F. compared to about 1250 degrees absolute or about 30%. The drop in volume would be approximately proportional to the percentage temperature drop. In the third cooling element, the percentage volume drop may be as little as 260/850 or about 30%. The volume flow rate of the vapor stream therefore may drop by at least 40% or even more than 60% when passing from the heating zone until the vapor stream exits the third cooling unit, passing from as much as 1200° F. to less than 60° F. and even to 40° F.

What we claim is:

1. A process for the removal of mercury from materials and for the recovery of mercury comprising:

heating material which contains mercury to a temperature of at least 900° F. in a heating zone to create a first gaseous phase which contains mercury, directing said first gaseous phase at a temperature of at least 900° F. to a first cooling unit which reduces the temperature of said gaseous phase by at least 100° F. to a temperature which is above the boiling point of mercury, collecting a first condensate which is condensed from said gaseous phase which enters into said first cooling unit and sending a second gaseous phase which contains mercury and which second gaseous phase is at a temperature above the boiling point of mercury to a second cooling unit, and in said second cooling unit, reducing the temperature of said second gaseous phase to a temperature at least 100° F. below the boiling point of mercury, collecting a condensate which comprises mercury, and sending a third gaseous phase out of said second cooling unit at a temperature which is at least 100° F. below the boiling point of mercury.

2. A process for the removal of mercury from materials and for the recovery of mercury comprising:

heating material which contains mercury at a temperature of at least 1000° F. to create a gaseous phase which contains mercury, directing said gaseous phase at a temperature of at least 1000° F. to a first cooling unit which reduces the temperature of said gaseous phase by at least 200° F. to a temperature which is above the boiling point of mercury, collecting a first condensate which is condensed from said gaseous phase which enters into said first cooling unit and sending a second gaseous phase which contains mercury and which second gaseous phase is at a temperature above the boiling point of mercury to a second cooling unit, in said second cooling unit reducing the temperature of said second gaseous phase to a temperature at least 100° F. below the boiling point of mercury, collecting a condensate which comprises mercury, and sending a third gaseous phase out of said second cooling unit to a third cooling unit at a temperature which is above 200° F., but is at least 100° F. below the boiling point of mercury, and sending said third gaseous phase to a third cooling unit which cools said third gaseous phase by at least 100° F. to a temperature which is below the boiling point of water, thereby condensing both additional mercury and water within said third gaseous phase and emitting a fourth gaseous phase.

3. The process of claim 1 wherein after sending a third gaseous phase out of said second cooling unit at a temperature which is above 100° F., but at least 100° F. below the boiling point of mercury, passing said third gaseous phase through at least one filter which is capable of withdrawing mercury from said third gaseous phase.

4. The process of claim 1 wherein after said first gaseous phase is heated to at least 900° F. and before it enters said first cooling unit, said first gaseous phase passes through a velocity drop box.

5. The process of claim 4 wherein said first gaseous phase is heated within said velocity drop box.

6. The process of claim 5 wherein the temperature of said first gaseous phase entering said velocity drop box is within 50° F. of the temperature of said first gaseous phase when it exits said velocity drop box.

7. The process of claim 2 wherein after said first gaseous phase is heated to at least 1000° F. and before it enters said first cooling unit, said first gaseous phase passes through a velocity drop box.

8. The process of claim 7 wherein said first gaseous phase is heated within said velocity drop box.

9. The process of claim 8 wherein the temperature of said first gaseous phase entering said velocity drop box is within 50° F. of the temperature of said first gaseous phase when it exits said velocity drop box.

10. The process of claim 1 wherein said first gaseous phase is at a temperature of at least 1100° F. within said heating zone.

11. The process of claim 10 wherein said first gaseous phase is cooled within said first cooling unit to a temperature between 700° F. and 800° F.

12. The process of claim 10 wherein said second gaseous phase is cooled in said second cooling unit to a temperature between 250° F. and 400° F.

13. The process of claim 1 wherein said material which contain mercury is tumbled while it is being transported within said heating zone.

14. The process of claim 2 wherein said material which contain mercury is tumbled while it is being transported within said heating zone.

15. The process of claim 12 wherein said fourth gaseous phase is passed through at least two consecutive filters which remove mercury from said fourth gaseous phase.

16. The process of claim 15 wherein a water scrubber is used to clean gaseous material after it has passed through said two consecutive filters.

17. Apparatus for the removal of mercury from materials and for the recovery of mercury comprising:

a confined heating area having a heating zone, which heating area can heat material inside said heating zone at a temperature of least 900° F. to create a first gaseous phase which contains mercury, a fluid conductive path for directing said first gaseous phase at a temperature of at least 900° F. to a first cooling unit which reduces the temperature of said gaseous phase to a temperature above the boiling point of mercury, collection means for collecting a first condensate which is condensed from said gaseous phase which enters into said first cooling unit and a fluid conductive path for directing a second gaseous phase which contains mercury out of said first cooling unit and which second gaseous phase is at a temperature above the boiling point of mercury to a second cooling unit, a second cooling unit which reduces the temperature of said second gaseous phase to a temperature below the boiling point of mercury, and a collection means for collecting a condensate which comprises mercury, and a fluid conductive path sending a third gaseous phase out of said second cooling unit at a temperature which is above 100° F., but at least 100° F. below the boiling point of mercury, and after said second cooling unit, a fluid conductive path directing said third gaseous phase through at least one filter which is capable of withdrawing mercury from said third gaseous phase.

18. Apparatus for the removal of mercury from materials and for the recovery of mercury comprising:

a confined heating area having a heating zone, which heating area can heat material inside said heating zone at a temperature of least 900° F. to create a first gaseous phase which contains mercury, a fluid conductive path for directing said first gaseous phase at a temperature of at least 900° F. to a first cooling unit which reduces the temperature of said gaseous phase to a temperature above the boiling point of mercury, collection means for collecting a first condensate which is condensed from said gaseous phase which enters into said first cooling unit and a fluid conductive path for directing a second gaseous phase which contains mercury out of said first cooling unit and which second gaseous phase is at a temperature above the boiling point of mercury to a second cooling unit, a second cooling unit which reduces the temperature of said second gaseous phase to a temperature below the boiling point of mercury, and a collection means for collecting a condensate which comprises mercury, and a fluid conductive path sending a third gaseous phase out of said second cooling unit at a temperature which is above 100° F., but at least 100° F. below the boiling point of mercury, and a fluid conductive path directing said third gaseous phase to a third cooling unit which cools said third gaseous phase by at least 100° F. to a temperature which is below the boiling point of water, emitting a fourth gaseous phase.

19. The apparatus of claim 18 wherein there is a fluid conductive path directing said fourth gaseous phase is out of said third cooling unit and passing said fourth gaseous phase through at least one filter which is capable of withdrawing mercury from said fourth gaseous phase.

20. A process for the removal of mercury from materials and for the recovery of mercury comprising:

heating material which contains mercury to a temperature of at least 900° F. in a heating zone to create a first gaseous phase which contains mercury, directing said first gaseous phase at a temperature of at least 900° F. to a first cooling unit which reduces the temperature of said gaseous phase by at least 100° F. to a temperature which is above the boiling point of mercury, collecting a first condensate which is condensed from said gaseous phase which enters into said first cooling unit and sending a second gaseous phase which contains mercury and which second gaseous phase is at a temperature above the boiling point of mercury to a second cooling unit, and in said second cooling unit, reducing the temperature of said second gaseous phase to a temperature at least 100° F. below the boiling point of mercury, collecting a condensate which comprises mercury, and sending a third gaseous phase out of said second cooling unit at a temperature which is above 100° F., but at least 100° F. below the boiling point of mercury.

21. The process of claim 2 after said fourth gaseous phase is out of a cooling area within said third cooling unit, passing said fourth gaseous phase through at least one filter which is capable of withdrawing mercury from said fourth gaseous phase.

22. The apparatus of claim 18 wherein said material within said heating zone is moved by means of blades on a shaft and said shaft within said heating zone is at an angle between 2.5° and 15 to the ground.

23. The apparatus of claim 19 wherein said material within said heating zone is moved by means of blades on a shaft and said shaft within said heating zone is at an angle between 2.5° and 15 to the ground.

24. The apparatus of claim 22 wherein means are available for introducing said material into said heating zone and said means for introducing said material deposit said material past a first complete turn of said blades on said shaft.

25. The apparatus of claim 23 wherein means are present for introducing said material into said heating zone and said means for introducing said material deposit said material past a first complete turn of said blades on said shaft.

26. The apparatus of claim 20 wherein after said first gaseous phase which contains mercury leaves said heating zone, but before said first cooling unit, there is a velocity drop box.

27. The apparatus of claim 26 wherein said material within said heating zone is moved by means of blades on a shaft and said shaft within said heating zone is at an angle between 2.5° and 15 to the ground, and wherein means are present for introducing said material into said heating zone and said means for introducing said material deposit said material past a first complete turn of said blades on said shaft.

28. The process of claim 13 wherein said tumbling is performed by blades on a shaft which blades tumble said material which contains mercury.

29. The process of claim 28 wherein said blades move the material which contains mercury at an angle with respect to ground outside of the heating zone, and said angle is between 2.5° and 15° with respect to said ground.

30. The process of claim 29 wherein said first gaseous phase passes through a velocity drop box and said first gaseous phase is heated within said drop box.

* * * * *